United States Patent [19]

Whiteley

[11] Patent Number: 5,767,600
[45] Date of Patent: Jun. 16, 1998

[54] MODULAR MOTOR

[76] Inventor: Eric Whiteley, 611 Weller St., Peterborough, Ontario, Canada, K9J 4W8

[21] Appl. No.: 806,737

[22] Filed: Feb. 27, 1997

[51] Int. Cl.[6] .................... H02K 15/06; H02K 1/22; H02K 3/00
[52] U.S. Cl. .................... 310/184; 310/179; 310/268; 310/254; 310/58; 310/64; 310/65
[58] Field of Search .................... 310/184, 254, 310/268, 43, 179, 52, 58, 64, 65; 29/596, 598

[56] References Cited

U.S. PATENT DOCUMENTS

| | | | |
|---|---|---|---|
| 2,006,172 | 6/1935 | Klapauf | 172/120 |
| 2,864,964 | 12/1958 | Kober | 310/112 |
| 3,428,840 | 2/1969 | Kober | 310/114 |
| 3,700,943 | 10/1972 | Heintz | 310/168 |
| 4,211,945 | 7/1980 | Tawse | 310/112 |
| 4,233,532 | 11/1980 | Esters | 310/46 |
| 4,326,139 | 4/1982 | Mowbray | 310/42 |
| 4,358,693 | 11/1982 | Palmer et al. | 310/46 |
| 4,426,771 | 1/1984 | Wang et al. | 29/596 |
| 4,524,902 | 6/1985 | Lordo | 310/112 |
| 4,605,874 | 8/1986 | Whiteley | 310/268 |
| 4,954,742 | 9/1990 | Izukawa | 310/316 |
| 5,397,953 | 3/1995 | Cho | 310/254 |
| 5,473,211 | 12/1995 | Arkkio | 310/166 |
| 5,479,059 | 12/1995 | Weinberger | 310/90.5 |
| 5,531,015 | 7/1996 | Manlief et al. | 29/599 |

FOREIGN PATENT DOCUMENTS

| | | |
|---|---|---|
| 2005807 | 1/1991 | Canada. |
| 844481 | 5/1952 | Germany. |
| 291013 | 5/1953 | Switzerland. |
| 1 349 746 | 4/1974 | United Kingdom. |

*Primary Examiner*—Steven L. Stephen
*Assistant Examiner*—Michael J. Wallace, Jr.
*Attorney, Agent, or Firm*—Thomas A. O'Rourke

[57] ABSTRACT

Disclosed herein is a modular motor comprising a discoidal stator unit and a discoidal rotor unit rotatable about an axis of rotation under a torque established therein, the stator unit being supported by a frame arrangement and having a winding assembly within in a matrix of polymer material, the winding assembly including a number of winding elements, each of the winding elements having a pair of radially disposed portions, wherein at least one of the radially disposed portions of each winding element is spaced from a radially disposed portion of another winding element to form a cooling region therein, the cooling region being arranged for the location therein of thermally conductive materials having a thermal conductance of at least 1.5 w·cm/(cm$^2$·°C.), thereby to transfer heat from the stator unit and toward the frame arrangement during operation of the motor.

19 Claims, 9 Drawing Sheets

MODULAR MOTOR

BACKGROUND OF THE INVENTION

1. Field of the Invention

The present invention relates to functionally modular motors.

2. Description of the Related Art

Brushless D.C. motors of various types are known wherein torque is produced by the interaction of a permanent magnet rotor with stationary windings carrying pulses of d.c. current. An example of such a prior art motor is disclosed in the applicant's published Canadian Patent Application 2005807 which is incorporated herein by reference. This reference discloses a functionally modular motor having a torque-producing module, a shaft and bearing module and a rotor parameter-sensing module, embodied in a motor having a dual-disc permanent magnet rotor and a stator separated by an axially oriented air gap. This type of motor will be referred to hereinbelow as a 'modular' motor. While the modular motors described in the prior art are capable of operating in a satisfactory manner, their compact size makes them dependent on conductive heat transfer for cooling, which to date has placed certain limitations on their capacity.

It is, thus, an object of the present invention to provide a novel modular motor It is another object of the present invention to provide a motor with improved internal heat transfer characteristics, thereby to improve torque operating ranges relatively independent of motor RPM.

SUMMARY OF THE INVENTION

Briefly stated, the invention involves a modular motor comprising a discoidal stator unit and a discoidal rotor unit rotatable about an axis of rotation under a torque established therein, said stator unit being supported by a frame arrangement and having a winding assembly within in a matrix of polymer material, said winding assembly including a number of winding elements, each of said winding elements having a pair of radially disposed portions, wherein at least one of said radially disposed portions of each winding element is spaced from a radially disposed portion of another winding element to form a cooling region therein, said cooling region being arranged for the location therein of thermally conductive materials having a thermal conductance of at least 1.5 w·cm/(cm$^2$·° C.), thereby to transfer heat from said stator unit and toward said frame arrangement during operation of said motor.

In another aspect of the present invention, there is provided a method of cooling a modular motor of the type having a discoidal stator unit and a discoidal rotor unit rotatable about an axis of rotation under a torque established therein, said stator being supported by a frame arrangement and having a winding assembly encased in a matrix of polymer material, said winding assembly including a number of winding elements, each of said of said winding elements having a pair of radially disposed portions, said method comprising the steps of:

spacing at least one of said radially disposed portions of each winding element from a radially disposed portion of another winding element to form a cooling region therein;

locating in said cooling region, a thermally conductive material having a thermal conductance of at least 1.5 w·cm/(cm$^2$·° C.), thereby to transfer heat from said from said stator unit toward said frame arrangement during operation of said motor.

In still another aspect of the present invention, there is provided a discoidal winding assembly for an electric motor, comprising a plurality of winding elements, said winding elements being arranged so as to form a plurality of cooling regions between adjacent winding elements, said cooling regions containing thermally conductive materials arranged to transfer heat radially outwardly therefrom, said thermally conductive materials being further arranged to suppress eddy current losses therein.

In still another aspect of the present invention, there is provided a method of improving conductive heat transfer in a discoidal stator unit for an electric motor, comprising steps of:

providing a plurality of winding elements, forming a plurality of cooling regions between adjacent winding elements, locating said winding elements in a matrix of polymer material; and arranging each of said cooling regions to receive a thermally conductive material, to transfer heat radially outwardly toward an adjacent frame structure, said thermally conductive materials being further arranged to suppress eddy current losses therein.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

The term 'winding element' herein is intended to refer to a coil of wire formed according to predetermined dimensional tolerances.

The term 'winding set' is intended to refer to a number of winding elements.

The term 'winding assembly' is intended to refer to an assembly of a number of winding sets to form one component of a stator unit.

Figure 1:
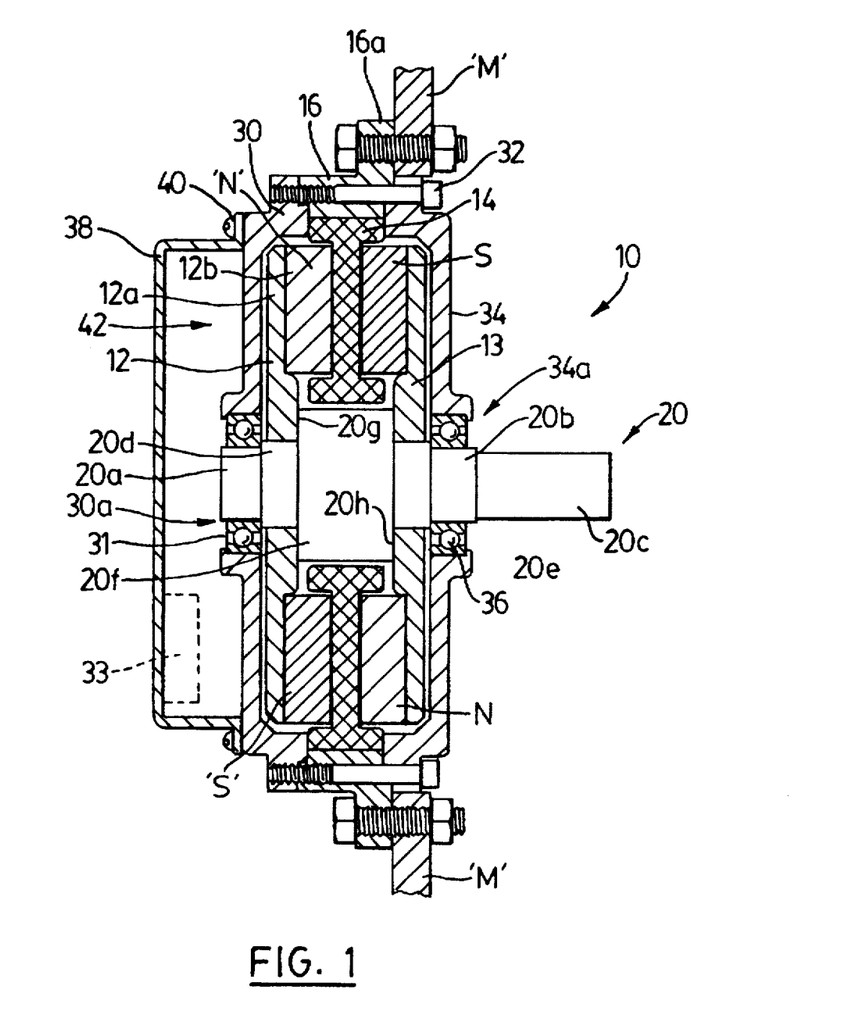
FIG. 1 is a sectional view of a modular motor.

Referring to the figures, particularly FIG. 1, there is provided a modular motor 10 having an inner rotor disc arrangement 12 and an outer rotor disc arrangement 13, each of which include a disc plate 12a and a number of permanent magnets 12b attached go thereto, or alternatively a permanent magnet ring structure axially magnetized in a pattern of north and south magnetic poles. The magnets 12b are arranged to provide a plurality of alternating north and south poles, 'N' and 'S' respectively, on opposite sides of a stator unit 14. A frame arrangement, in the form of a stator ring member 16, supports the stator unit 14 in position and this includes a mounting flange 16a to mount the motor 10 to an adjacent frame member as shown at 'M'. This adjacent frame member M may, for example, be part of a machine that the motor 10 is to drive.

The disc arrangements 12, 13 are positioned relative to the stator unit 14 by way of an axle 20 which has a pair of bearing regions 20a, 20b with substantially the same diameter, along with an outer end 20c adjacent one of the bearing regions 20a, 20b to serve as a torque output shaft for the motor 10.

The axle 20 has a pair of inner regions 20d, 20e relatively larger in diameter than the bearing regions and a central region 20f is located between the inner regions 20d, 20e with a still larger diameter. The diameter difference between the inner regions 20d, 20e and central region 20f presents two outwardly facing abutment faces 20g, 20h. Each of the outer and inner rotor discs are positioned adjacent to and are fixed with a corresponding abutment face by way of threaded fasteners not shown.

An inner bearing support bracket 30 is fixed to the stator ring member 16 by way of threaded fasteners 32 and has an aperture 30a with a bearing 31 therein which is engaged with the axle 20 at one bearing region thereof. Similarly, an outer bearing support bracket 34 is fixed to the stator ring member 16 opposite to the inner bearing support bracket 30 and by way of the same threaded fasteners 32. The outer bearing support bracket 34 has an aperture 34a with a bearing 36 therein which is engaged with the axle 20 at the bearing region 20b. An end plate 38 is also provided adjacent the inner bearing support bracket 30 and fixed thereto by way of a number of threaded fasteners shown at 40. The end plate 38 and the inner bearing support bracket 30 provide therebetween a chamber 42 for locating electronic circuitry to operate the motor, as shown in phantom at 33.

Each of the bearing assemblies and the stator ring member 16 are arranged to seal the operating components of the motor 10 from its external ambient environment. This means that the motor 10 is particularly useful in applications where the motor 10 must be able to withstand hostile environments.

It can be seen from FIG. 1 that the outer diameter of the axle's central region is also arranged to provide a minimum air gap between the outer surface thereof and an inner surface presented by the stator unit 14. Furthermore, the outer surfaces of the disc arrangements 12, 13 are also arranged to provide a minimum air gap with the adjacent surfaces of the bearing assemblies and the stator unit 14. It can thus be seen that the motor 10 can be formed in a manner that requires minimal air spacing therein and therefore presents a compact size for a given torque rating.

Referring to FIGS. 2 to 8, the stator unit 14 has a winding assembly 50, which includes a number of winding elements 52, and molded into a polymer matrix shown at 53. In addition, cooling is provided by heat conductive material which is placed in intimate heat transfer relationship to the winding elements 52 as will be described.

As shown in FIGS. 9 to 15, the winding elements 52 are preferably formed with a 'fill factor' ranging from about 30 to about 35 percent. The term 'fill factor' refers to the proportion of the total overall volume occupied by the winding element 52 that is in fact occupied by the wire of the winding element 52, the balance being occupied by other materials such as insulating tape and polymer matrix as will be described. In other words, the higher the fill factor, the greater the density of wire in the winding element 52.

Figure 9:
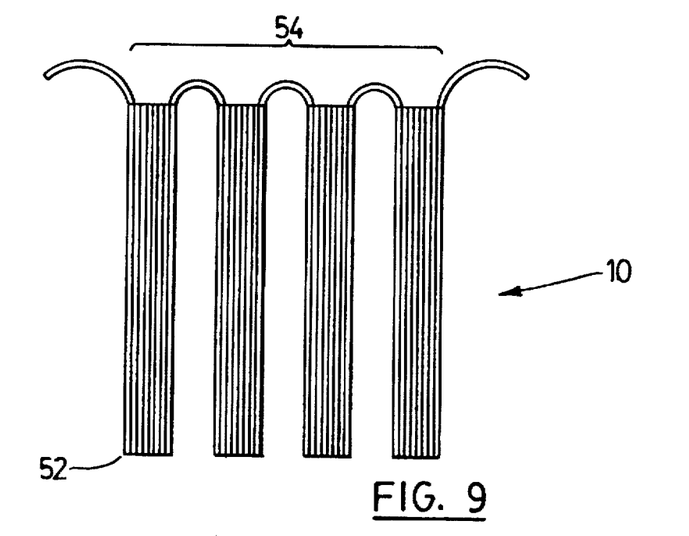
FIG. 9 is a side view of a winding set used in the fabrication of the winding assembly portion of FIG. 2.

The winding elements 52 are formed into winding sets as shown in FIG. 9, each containing a number of winding elements 52, three in this particular case. The winding sets are formed from a conductive filament having a diameter ranging from about 0.020 to 0.008 inches, preferably a copper alloy material having a diameter of about 0.020 inches. This small diameter is chosen to minimise eddy current losses. More preferably, the winding elements 52 making up each of the three phases are formed from a single strand of the filament.

The winding elements 52 take the shape as shown in FIGS. 12 to 15 after a forming step, each having a pair of radial portions 56 which are positioned radially in the winding assembly as will be described, an outer end portion 58 and an inner end portion 60. The outer and inner end portions 58, 60 are offset relative to a plane in which the two radial portions 56 are located.

Figures 2, 3, 5, 6:
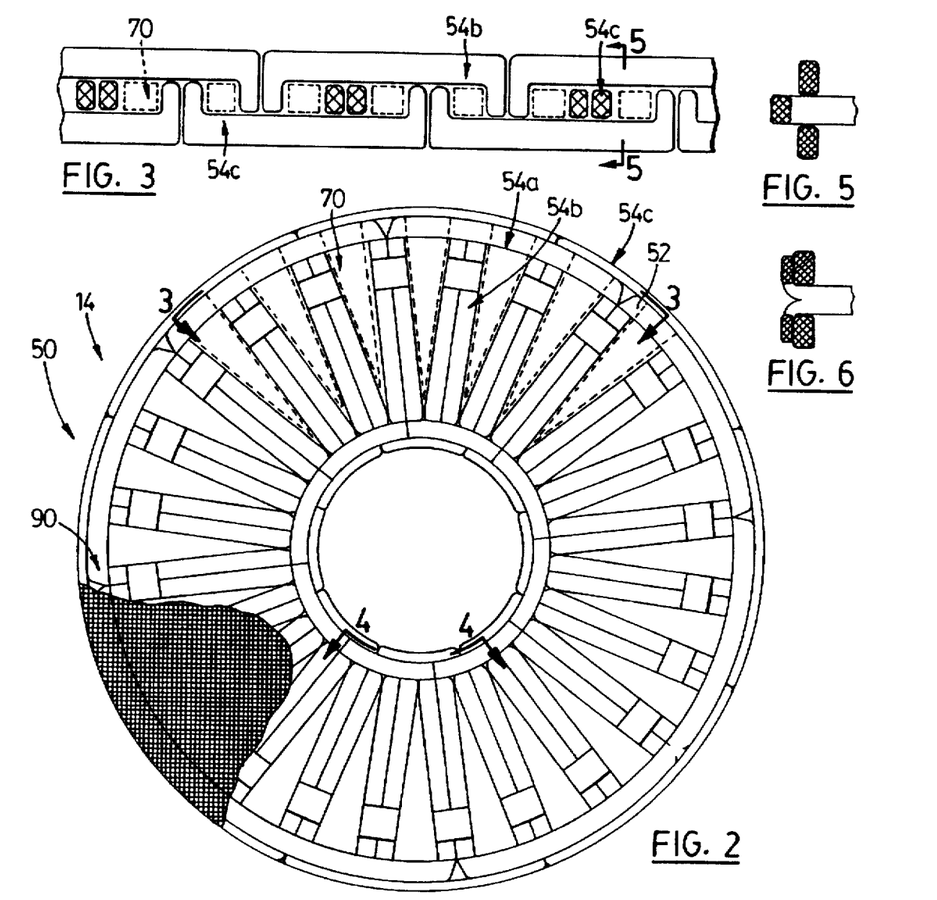
FIG. 2 is a fragmentary axial view of a winding assembly portion of the motor of FIG. 1.
FIG. 3 is a sectional view taken on line 3—3 of FIG. 2.
FIG. 5 is a schematic view taken on line 5—5 of FIG. 3 showing one step in the fabrication of the winding assembly portion FIG. 2.
FIG. 6 is another schematic view of another step in the fabrication of the winding assembly portion FIG. 2.

Referring to FIG. 2, three winding sets 54a, 54b and 54c are used in the winding assembly 50, to correspond to one phase of multiple phase, in this case three phase, power switching system, which is conventionally used to reduce the pulse torquing that would otherwise occur with a single phase. Each winding set is formed by coupling, such as for example by way of mylar tape, adjacent pairs of radial portions of the winding elements, thereby to form radial pairs.

In the winding assembly 50 as shown in FIGS. 2 to 6, the outer and inner end portions 58, 60 of the first phase winding elements 52 are arranged to face into the page while the outer and inner end portions 58, 60 of the third phase winding elements 52 are arranged to face out of the page, as shown in FIG. 2. The second phase is different from the first and third phases in that the outer end portion 58 of each winding element 52 is split with a first portion bent over to engage the outer portions of the first phase winding elements 52 and a first portion bent over to engage the outer portions of the third phase winding elements 52 as shown in FIGS. 5 and 6. The inner end portions 58, 60 are also split into two portions and bent over the respective inner end portions 60 of the first and third phase winding elements 52.

Looking more particularly at the winding assembly 50 as viewed in FIG. 3, the first, second and third phase winding sets are arranged so that they are each offset from the other. For example, each adjacent radial pair of the second phase winding elements has, on its left, a radial pair of the third phase winding elements and, on its right, a radial pair of the first phase winding elements. Furthermore, these alternating radial pairs from the first, second and third phases are spaced from one another to form a repeating series of cooling regions 70 therein.

The cooling regions 70 are arranged to permit heat conductive material to be placed in close heat transfer relationship with the winding elements 52 to maximize the cooling thereof.

The cooling region is preferably arranged for the location therein of thermally conductive materials having a thermal conductance of at least 1.5 w·cm/(cm$^2$·° C.), thereby to transfer heat from the stator unit and toward the frame arrangement during operation of the motor. More preferably, the cooling regions extend radially across the stator unit and the thermally conductive elements are thermally coupled with the frame arrangement for heat transfer thereto.

Figures 16, 16A:
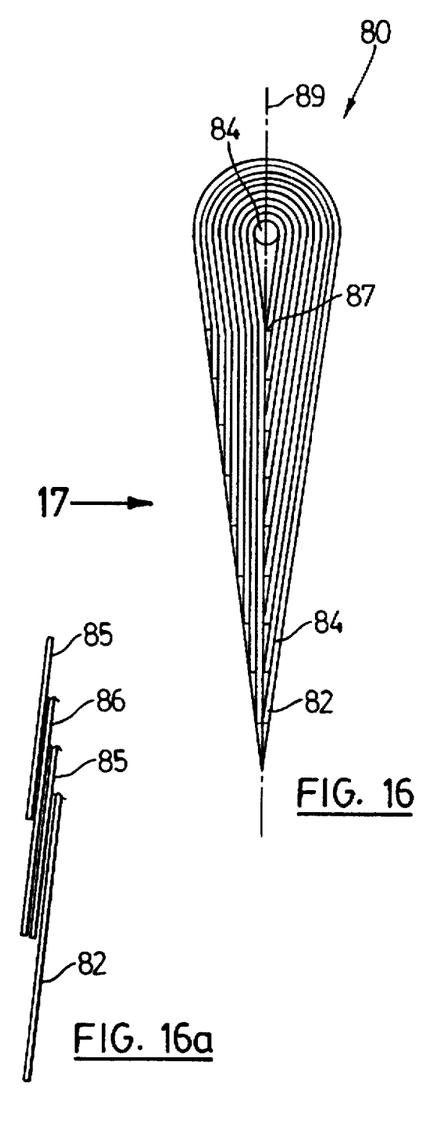
FIG. 16 is a side view of a thermally conductive element used in the formation of the winding assembly portion shown in FIG. 2.
FIG. 16a is a magnified fragmentary assembly view of a portion of the thermally conductive element shown in FIG. 16.
Figure 17:
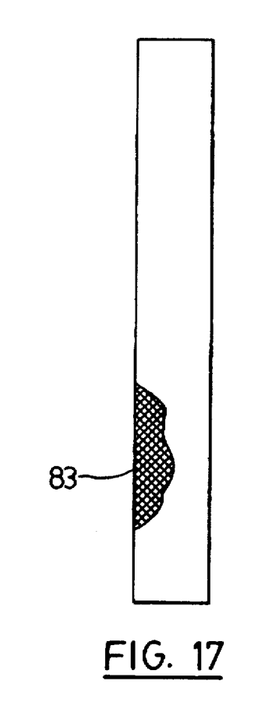
FIG. 17 is a side view taken on arrow 17 of FIG. 16.

For example, the conductive material may be in the form of a cooling fluid, such as water, a glycol-based or other coolant, or a solid material such as copper. For example, a thermally conductive element 80, as shown in FIGS. 16 and 17, may be provided in each of these cooling regions 70 for transferring heat therefrom.

The thermally conductive element 80 is arranged to fit within a corresponding one of the cooling regions 70. Each thermally conductive element So includes a laminate structure formed by a plurality of heat conductive strip segments. In this case, the thermally conductive element 80 is formed from a number of laminated conductive strips 82 which are formed with two convergent side surfaces, each to lie adjacent a corresponding radial pair. The thermally conductive element 80 generally takes the shape of an inverted tear drop with a single layer of self-adhesive mylar tape 85 to isolate each strip from an adjacent strip as shown at 86, as shown in FIG. 16a.

To form the thermally conductive element 80, first an anchor pin 84 is arranged as a mandrel. A number of copper strips, preferably nine, are then bent over the mandrel to form a pair of leg portions on either side thereof with a bight junction portion therebetween. In this case, the mandrel defines a central axis and the bight portions are aligned relative to the central axis. The leg portions on one side are also provided with a slight jog 87 which improves the alignment of the so-formed leg portions with a single longitudinal axis as shown at 89. As mentioned above, each of the strips 82 is insulated on one side so that the strips 82 are electrically isolated from one another and this may be done with a single layer self-adhesive mylar tape. Once the strips 82 are in place, the thermally conductive element 80 can be completed by applying one layer of glass cloth 83 to both sides of the assembly with epoxy adhesive.

More preferably, there are three groups of three strips 82 of equal length, including three inner strips, three middle strips which are relatively longer than the inner strips and three outer strips which are relatively longer than the middle strips.

Referring again to FIGS. 2 and 8, another feature of the stator unit 14 is the provision of a layer of reinforcing material 90 which is located on the winding assembly 50 so that it is immediately adjacent the outer peripheral surface of the so-formed stator unit 14. The reinforcing material is selected so that it is capable of inhibiting the progression of microcracks through the polymer material, as may occur at the outer surface due to temperature gradients and fluctuations thereof during operation. Preferably, the reinforcing material is glass cloth material.

Figure 10:
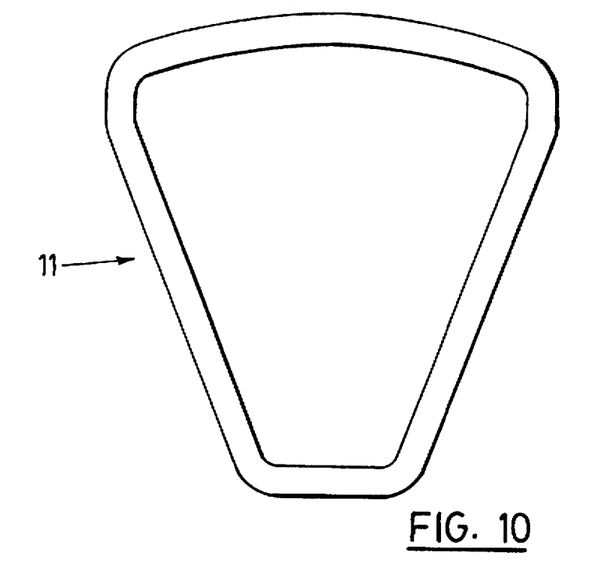
FIG. 10 is a view taken on arrow 10 of FIG. 9.
Figure 11:
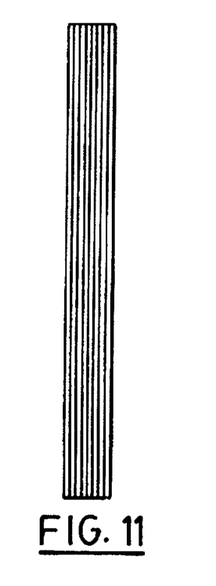
FIG. 11 is a view taken on arrow 11 of FIG. 10.
Figure 12:
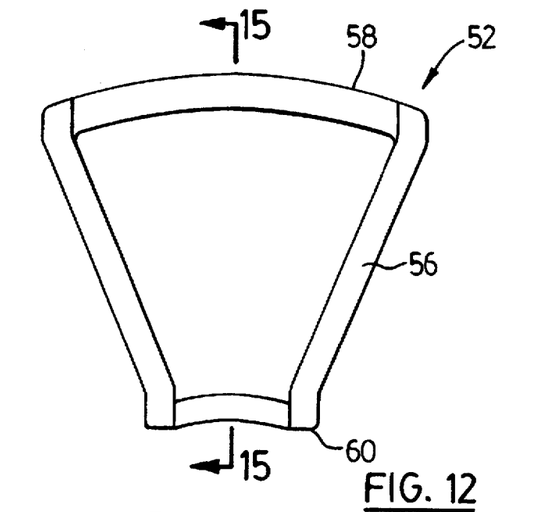
FIG. 12 is front view of one winding element of the winding set of FIG. 9 following a subsequent forming step.
Figure 13:
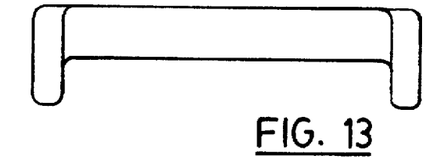
FIG. 13 is a top plan view of the winding element of FIG. 12.
Figure 14:
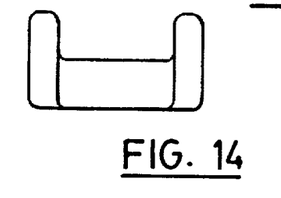
FIG. 14 is a bottom plan view of the winding element of FIG. 12.
Figure 15:
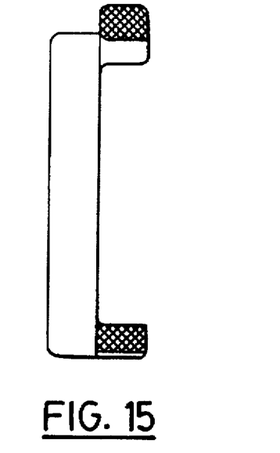
FIG. 15 is a sectional view taken on line 15—15 of FIG. 12.

The stator unit 14 is formed in the following manner. The winding elements 52 are first wound on a winding form to adopt the shape as shown in FIGS. 9 to 11. The winding elements 52 for phases 1 and 3 are then formed by a forming tool to provide the offset outer and inner end portions 58, 60 as shown in FIGS. 12 to 16. The winding sets for all phases are then assembled as discussed above to form the winding assembly 50 shown in FIG. 2.

A thermally conductive element 80 is then located in each of the cooling regions 70 in the manner described above. The winding assembly 50 is then wrapped with the layer of reinforcing material 90 and tacked thereon with beads of adhesive material. The winding assembly 50 is brought to required dimensions and the winding connections are made to allow three phase switching of the stator unit 14.

The winding assembly 50 is then placed in a mold and is filled with a matrix of polymer material to form the stator unit, wherein the polymer material has an outer peripheral surface corresponding to the outer surface of the stator unit 14. Desirably, the polymer material is a low viscosity epoxy material to allow the polymer material to seep into the interstitial spaces between the winding elements 52 themselves and between the winding elements 52 and the thermally conductive elements 80. Preferably, the polymer material has a viscosity in the range of about 210 to 260 centipoise seconds. The stator unit is then assembled with the other components of FIG. 1 to complete the motor.

Figure 2A:
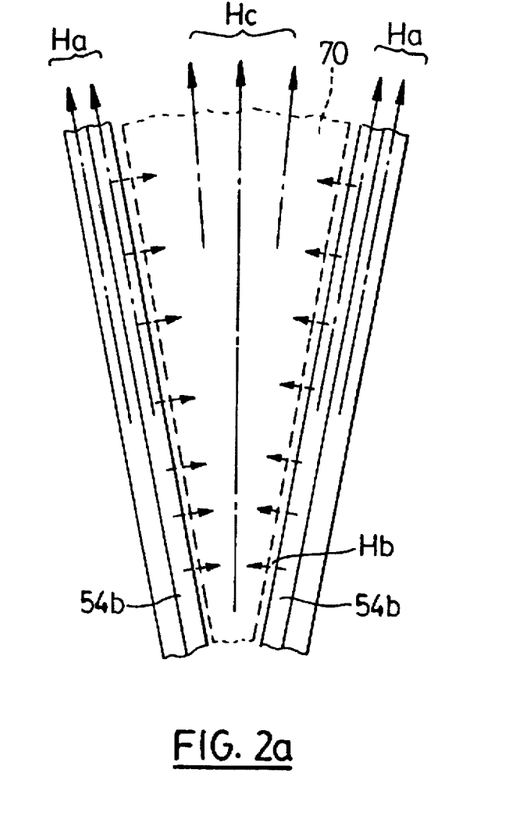
FIG. 2a is a fragmentary view of a portion illustrated in FIG. 2.
Figure 4:
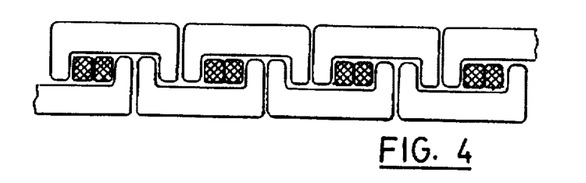
FIG. 4 is a sectional view taken on line 4—4 of FIG. 2.
Figure 7:
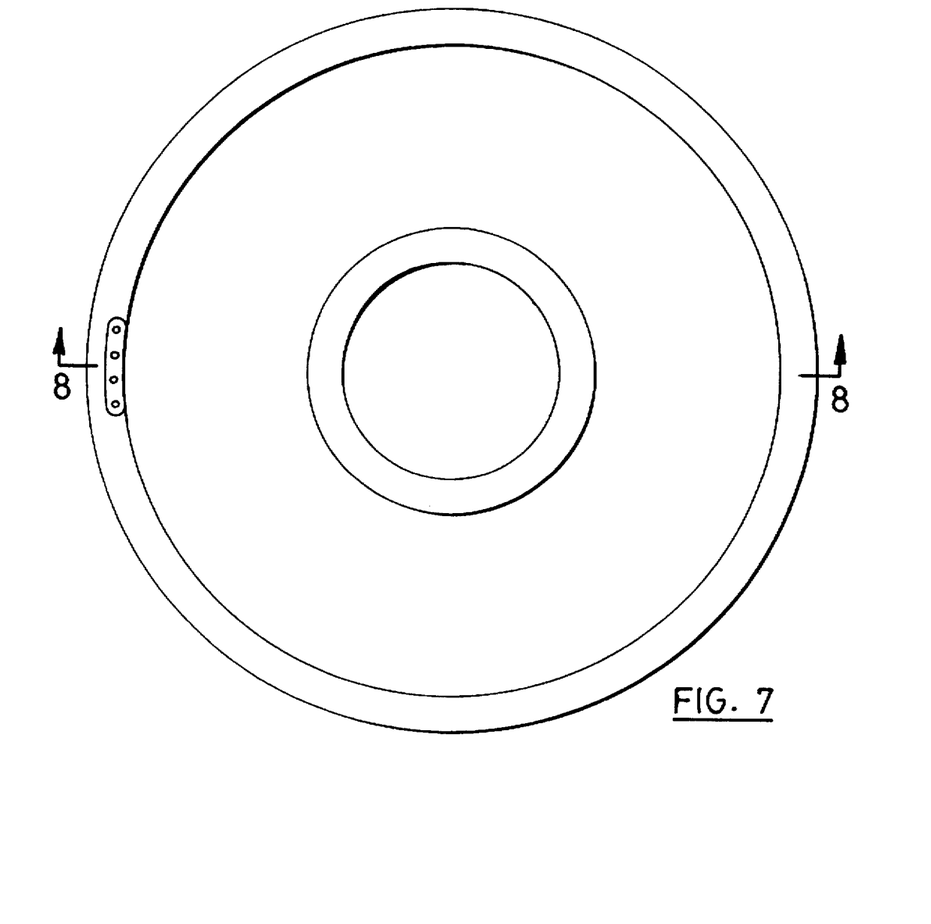
FIG. 7 is another axial view of the winding assembly portion of FIG. 2 following a subsequent forming step.
Figure 8:
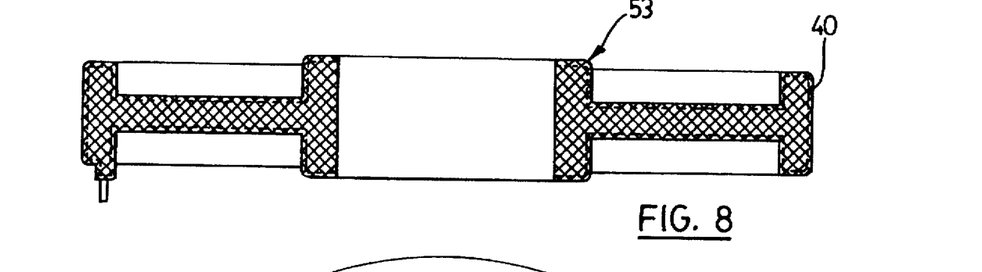
FIG. 8 is a sectional view taken on line 8—8 of FIG. 7.

In use, multiple phase, in this case three phase, D.C. power pulses are delivered to the stator unit 14, resulting in currents flowing through each of the three winding sets and torque being generated at the torque output shaft. As a result, each of the winding sets generates heat. As shown in FIG. 2a, this heat is transferred radially outwardly toward the adjacent frame structure along two paths, first through the winding sets themselves as shown by arrows 'Ha', that is along the radially disposed portions. The heat is also transferred tangentially across the polymer boundary separating the radially disposed portions with the adjacent thermally conductive element 80, as shown by arrows 'Hb' and continues in a radial direction toward the adjacent frame structure through the thermally conductive element 80 as shown by arrows 'Hc'. The heat is then transferred to the stator ring member 16, and thereafter out to the frame via the mounting flange 16a. This means that the motor 10 is capable of transferring heat from winding losses to the motor's mounting arrangement essentially by thermal conduction, into the adjacent frame structure by way of the frame member 'M' on which the motor is mounted.

Thus, the motor 10 provides an improved heat transfer regime by the use of two heat conduction paths, the first through the radial portions of the winding elements themselves and the second through the cooling regions located between adjacent radial pairs. In this first case, the radial portions of the winding sets transfer heat while at the same time generate heat through ohmic resistance losses therein. On the other hand, the cooling regions transfer heat while eddy current losses are suppressed, thereby minimizing ohmic resistance losses therein. In the case of the thermally conductive element 80, the eddy current losses are suppressed by the use of a laminated structure.

The modular motor 10 is highly compact with substantially improved cooling characteristics which are based on a principle that heat transferred due to winding losses is transferred out of the motor by radial thermal conduction to the periphery of the stator unit where it is in contact with a stator ring, through the windings themselves as well as through the cooling regions. For this conductive heat transfer through the cooling regions to be efficient, the cooling regions themselves should have a sufficient quantity of thermally conductive material, itself having a sufficiently high thermal conductance, such as for example a minimum thermal conductance of 1.5 w·cm/(cm$^2$·° C.).

Typical unit thermal conductances {w·cm/(cm$^2$·° C.)} are as follows:

Resin: 0.008
Copper: 3.5
Steel: 0.67
Aluminum: 2.0

The motor provides improved heat transfer characteristics through the motor by locating the cooling regions between the radial pairs of the windings, that is in regions of the stator unit which would otherwise be occupied by the resin matrix which has a relatively poor conductance as above noted. It is estimated that as much as a 30 percent improvement in radial winding loss heat transfer can be achieved by adding the thermal conductive elements in the cooling regions as above described.

The thermally conductive elements 80 should be dimensioned so that they extend, to the extent possible, substantially the entire length of the adjacent radial portions 56 of each winding element 52 and be intimately associated therewith. However, there should be sufficient spacing between the thermally conductive elements 80 and the radial portions 56 to enable the polymer material to flow therebetween to maintain the integrity of the molded assembly and winding insulation.

Thus, the above motor construction provides for the effective removal of internal heat from operating losses by thermal conduction from the winding elements to the adjacent supporting frame structures. This motor construction produces torque relatively independent of motor RPM and maximizes the heat conduction in an axial air-gap electric motor for a given frame size.

Figure 18:
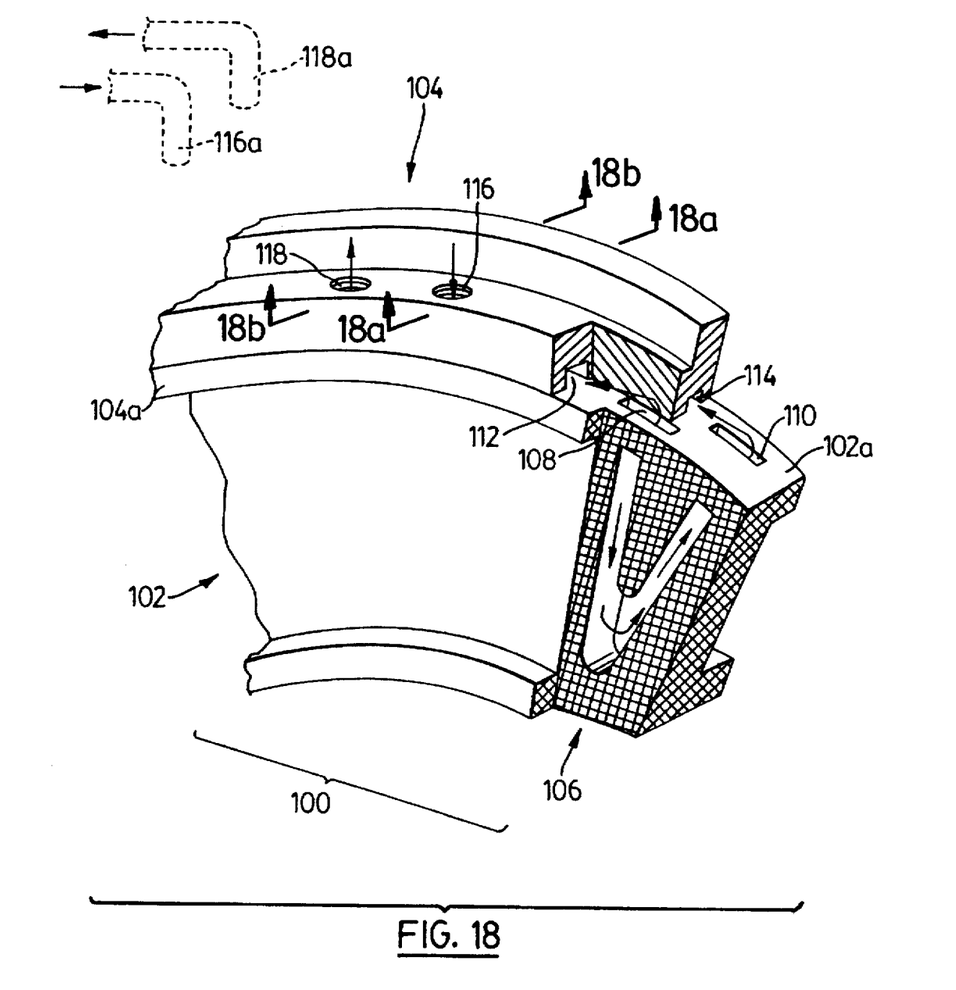
FIG. 18 is a fragmentary perspective view of another modular motor.
Figure 18A:
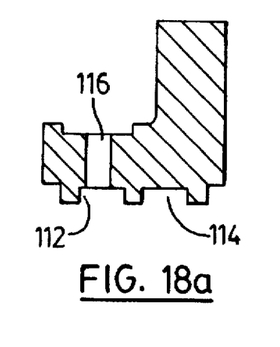
FIG. 18a is a sectional view taken on line 18a—18a of FIG. 18.
Figure 18B:
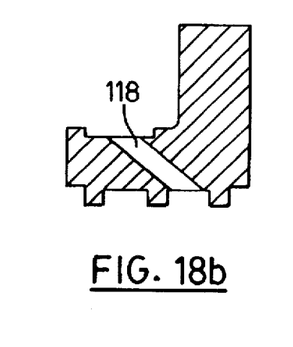
FIG. 18b is a sectional view taken on line 18b—18b of FIG. 18.

A segment of another modular motor is shown at 100 in FIG. 18, wherein a stator unit 102 is supported by frame arrangement in the form of a stator ring 104. A cooling region 106 is located between each radial pair, as described above. Each cooling region 106 includes an inlet passage 108 for the transfer of coolant fluids into the cooling region 106 and an outlet passage 110 for the transfer of coolant fluids from the cooling region 106. In this case, the stator unit 102 has an outer surface 102a which engages an inner surface 104a on the stator ring. The stator ring is further provided with an inlet channel 112 in fluid communication with the each inlet passage and an outlet channel 114 in fluid communication with each outlet passage. The inlet channel 112 has an aperture 116 to be connected with an inlet fluid coupling shown in dashed lines at 116a. The outlet channel 114 has an aperture 118 to be connected with an outlet fluid coupling 118a. It will be seen in FIG. 18b that the aperture 118 is formed as an angular extension of the outlet channel through the body of the stator ring.

The inlet and outlet channels are joined so that the coolant fluid can be passed through the inlet and outlet passages to be in intimate heat transfer relationship with the neighbouring winding elements, not shown. A cooling region of this type may be formed in a number of ways, including by the use of a casting technique which provides a core element 120 which is illustrated in FIGS. 19 to 23.

The core element 120 includes a pair of legs 122, 124 which are joined together at one end and which have large block formations 126, 128 at their other ends, to join the inlet channel and passage with the outlet channel and passage. Extending across the two separated block formations 126, 128 is a rigid construction strip shown at 129, the purpose of which is to hold the ends in position relative to one another in their final intended position, when this is incorporated into the resin structure. This strip thereby insures the proper spacing in maintained during handling and casting without having to rely on the inherent rigidity of the core element itself which may otherwise be rather low. The strip should be of a material compatible with the resin matrix into which it is finally cast.

Figures 19, 20:
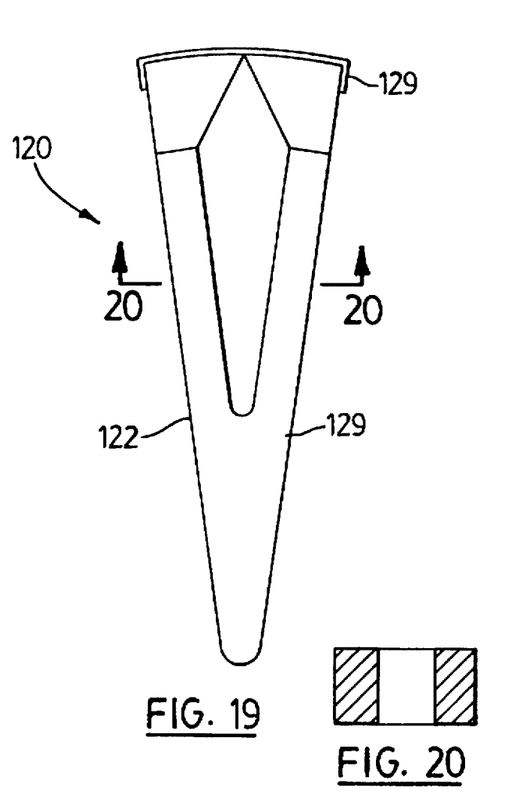
FIG. 19 is an end view of an element to form one component of the motor shown in FIG. 18.
FIG. 20 is a sectional view taken on line 20—20 of FIG. 19.
Figure 21:
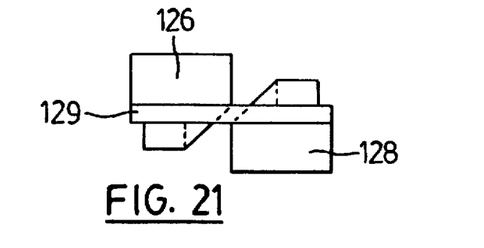
FIG. 21 is a top plan view of the element illustrated in FIG. 19.
Figure 22:
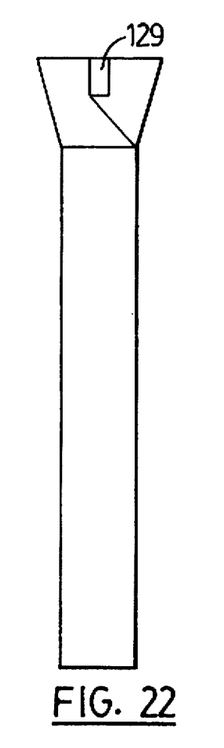
FIG. 22 is a side view of the element illustrated in FIG. 19.
Figure 23:
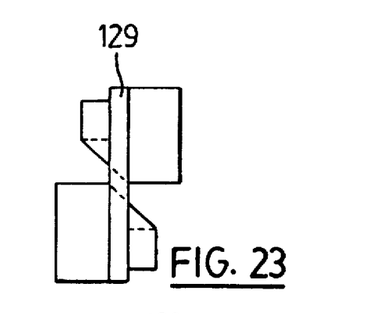
FIG. 23 is a top plan view of the element as illustrated in FIG. 22.

The stator unit 102 is formed in the following manner. First, a winding assembly is assembled with a core element 120 located in each of the cooling regions as described above. This is done while ensuring that there is sufficient space between the outer edge of the core element 120 all adjacent contact surfaces of the winding element, thereby to ensure that the polymer will entirely separate the core element 120 from those contact surfaces of the winding elements.

The winding assembly is then wrapped as discussed above and brought to the required dimensions. The winding connections are made, to allow three phase switching of the stator unit and thereafter, the winding assembly is placed in a mold and is filled with a matrix of polymer material as mentioned above. In this case, the core material is selected with a melting temperature which exceeds the temperature at which the matrix of polymer material is formed, but is sufficiently low to permit the core element 120 to be melted and substantially all of the material thereof removed. For example, the core element 120 may be constructed from paraffin wax or other materials with similar characteristics.

In other words, the core element 120 is formed from a material that can be safely melted out of the winding assembly after being filled with polymer and the polymer has solidified, thus leaving channels in the polymer structure for fluid flow. The core must be shaped and dimensioned to conform to the finished shape of, the winding assembly and the winding elements in it. This dictates its particular shape and the 'block formations' that must fit within the outer winding region, while providing a fluid path from the peripheral inlet openings to the radial channels. Once the winding assembly has been molded and the core element material subsequently removed, the outer periphery of the winding assembly is prepared to be inserted into the stator ring by aligning each of the inlet and outlet passages with the corresponding inlet and outlet channels 112, 114 respectively.

As in the case of the motor 10, an improved heat transfer regime is provided in the motor 100 by the use of two heat conduction paths, the first through the radial portions of the winding elements themselves and the second through the cooling regions located between adjacent radial pairs. In the second case, the cooling regions transfer heat while eddy current losses are suppressed. This suppression is achieved by using a non ferromagnetic coolant materials such as water, glycol-based or other coolant glycol mixtures, water and the like.

The present invention also concerns a method of cooling a modular motor comprising the steps of:

provivding a discoidal stator unit with a number of winding elements, arranging the winding elements with each having a pair of radial portions, each radial portion of one winding element being adjacent a radial portion of another winding element, the adjacent portions being spaced from one another in such a manner to form a repeating series of cooling regions therein.

What is claimed is:

1. A modular motor comprising a discoidal stator unit and a discoidal rotor unit rotatable about an axis of rotation under a torque established therein, said stator unit being supported by a frame arrangement, said stator unit having a winding assembly integrally formed within a matrix of polymer material, said winding assembly further including a number of winding elements, each of said winding elements having a pair of radial portions which are arranged radially relative to said axis of rotation, said winding elements being arranged in three winding sets, the radial portions of each winding set being arranged in radial pairs, wherein the radial pairs of said winding sets are spaced equally around said winding assembly with each radial pair from a first of said winding sets positioned between one radial pair from a second of said winding sets to form one cooling region and one radial pair from a third of said winding sets to form another cooling region, a plurality of thermally conductive elements, each of said thermally conductive elements being positioned in a corresponding one of said cooling regions, each of said thermally conductive elements being formed from thermally conductive materials having a thermal conductance of at least 1.5 w·cm/(cm$^2$·° C.), and including a plurality of laminated heat conductive strip segments, said thermally conductive elements being arranged to transfer heat from said stator unit and toward said frame arrangement during operation of said motor.

2. A motor as defined in claim 1 wherein said thermally conductive element has two convergent side surfaces, each to lie adjacent a corresponding radial pair.

3. A motor an defined in claim 2 wherein each of said strip segments includes a pair of leg portions joined by a junction portion.

4. A motor as defined in claim 3 wherein the junction portions of each of said strip segments are aligned relative to a central axis.

5. A modular motor comprising a discoidal stator unit and a discoidal rotor unit rotatable about an axis of rotation under a torque established therein, said stator unit being supported by a frame arrangement, said stator unit having a winding assembly integrally formed within a matrix of polymer material, said winding assembly further including a number of winding elements, each of said winding elements having a pair of radial portions which are arranged radially relative to said axis of rotation, the radial portions of each winding set being arranged in radial pairs; said winding elements being arranged in three winding sets, wherein the radial pairs of said winding sets are spaced equally around said winding assembly with each radial pair from a first of said winding sets positioned between one radial pair from a second of said winding sets to form one cooling region and one radial pair from a third of said winding sets to form another cooling region, a plurality of thermally conductive elements, each of said thermally conductive elements being positioned in a corresponding one of said cooling regions, each of said thermally conductive elements being formed from thermally conductive materials having a thermal conductance of at least 1.5 w·cm/(cm$^2$·° C.), said thermally conductive elements being arranged to transfer heat from said stator unit and toward said frame arrangement during operation of said motor, wherein said cooling region includes an inlet passage for the transfer of coolant fluids into said cooling region and an outlet passage for the transfer of coolant fluids out of said cooling region.

6. A motor as defined in claim 5 wherein said stator unit has an outer surface, said frame arrangement having an inner surface to engage said outer surface, an inlet channel in fluid communication with said inlet passage and an outlet channel in fluid communication with said outlet passage.

7. A modular motor as comprising a discoidal stator unit and a discoidal rotor unit rotatable about an axis of rotation under a torque established therein, said stator unit being supported by a frame arrangement, said stator unit having a winding assembly integrally formed within a matrix of polymer material, said winding assembly further including a number of winding elements, each of said winding elements having a pair of radial portions which are arranged radially relative to said axis of rotation, the radial portions of each winding set being arranged in radial pairs; said winding elements being arranged in three winding sets, wherein the radial pairs of said winding sets are spaced equally around said winding assembly with each radial pair from a first of said winding sets positioned between one radial pair from a second of said winding sets to form one cooling region and one radial pair from a third of said winding sets to form another cooling region, each of said thermally conductive elements being formed from thermally conductive materials having a thermal conductance of at least 1.5 w·cm/(cm$^2$·° C.), said thermally conductive elements being arranged to transfer heat from said stator unit and toward said frame arrangement during operation of said motor, wherein said polymer material has an outer surface coinciding with the outer surface of said stator unit, further comprising a layer of reinforcing material located within said matrix and immediately adjacent said outer surface, said reinforcing material being sufficient to inhibit the progression of microcracks through said polymer material.

8. A motor as defined in claim 7 wherein said reinforcing material is fibrous material.

9. A motor as defined in claim 8 wherein said polymer material is an epoxy material with a viscosity in the range of about 210 to 260 centipoise seconds.

10. A modular motor comprising a discoidal stator unit and a discoidal rotor unit rotatable about an axis of rotation under a torque established therein, said stator unit being supported by a frame arrangement, said stator unit having a winding assembly integrally formed within a matrix of polymer material, said winding assembly having a peripheral region for engagement with said frame arrangement, said winding assembly further including a number of winding elements, each of said winding elements having a pair of radial portions which are arranged radially relative to said axis of rotation, wherein at least one of said radial portions of each winding element is spaced from a radial portion of another winding element to form a cooling region therein which extends radially through said winding assembly to said peripheral region, a thermally conductive element being located in said cooling region and being formed from thermally conductive materials having a thermal conductance of at least 1.5 w·cm/(cm$^2$·° C.), said thermally conductive element being arranged to transfer heat from said stator unit and toward said frame arrangement during operation of said motor, said winding elements being formed with a fill factor ranging from about 30 to about 35 percent, said windings being formed from an electrically conductive filament, wherein said conductive filament is formed from a copper alloy material having a diameter of about 0.020 inches.

11. A discoidal winding assembly for an electric motor, comprising a plurality of winding elements, said winding elements being arranged so as to form a plurality of cooling regions between adjacent winding elements, said cooling regions containing thermally conductive materials arranged to transfer heat radially outwardly therefrom, said thermally conductive materials being further arranged to suppress eddy current losses therein, wherein said each of winding elements includes a pair of radial portions, each of said radial portions of one winding element being engaged with a radial portion of an adjacent winding element to form a radial pair, each of said cooling regions being located between adjacent radial pairs, wherein said winding sets are located within a matrix of polymer material, wherein said thermally conductive materials have a thermal conductance at least 1.5 w·cm/(cm$^2.°$ C.) and include a plurality of thermally conductive elements, each of said thermally conductive elements being positioned in a corresponding one of said cooling regions, wherein each thermally conductive element includes a plurality of laminated heat conductive strip segments.

12. A winding assembly an defined in claim 11 wherein said thermally conductive element has two convergent side surfaces, each to lie adjacent a corresponding radial pair.

13. A winding assembly as defined in claim 12 wherein each of said strip segments includes a pair of leg portions joined by a bight portion.

14. A winding assembly as defined in claim 13 wherein the bight portions of each of said strip segments are aligned relative to a central axis.

15. A winding assembly as defined in claim 11 wherein said thermally conductive materials include coolant fluids, said cooling region including an inlet passage for the transfer of said coolant fluids into said cooling region and an outlet passage for the transfer of said coolant fluids out of said cooling region.

16. A winding assembly as defined in claim 11, further comprising an outer surface and a layer of reinforcing material located within said matrix and immediately adjacent said outer surface, said reinforcing material being sufficient to inhibit the progression of microcracks through said polymer material.

17. A winding assembly as defined in claim 15 wherein said polymer material is a low viscosity epoxy material with a viscosity in the range of about 210 to 260 centipoise seconds, said winding elements having a fill factor ranging from about 30 to about 35 percent, said winding elements formed from an electrically conductive filament having a diameter ranging from about 0.020 to 0.008 inches.

18. A discoidal winding assembly for an electric motor, comprising a plurality of winding elements, said winding elements being arranged so as to form a plurality of cooling regions between adjacent winding elements, said cooling regions containing thermally conductive materials arranged to transfer heat radially outwardly therefrom, wherein said each of winding elements includes a pair of radial portions, each of said radial portions of one winding element being engaged with a radial portion of an adjacent winding element to form a radial pair, each of said cooling regions being located between adjacent radial pairs, wherein said winding sets are located within a matrix of polymer material, wherein said thermally conductive materials have a thermal conductance of at least 1.5 w·cm/(cm$^2.°$ C.) and include a plurality of thermally conductive elements, each of said thermally conductive elements being positioned in a corresponding one of said cooling regions, wherein said cooling region includes an inlet passage for the transfer of coolant fluids into said cooling region and an outlet passage for the transfer of coolant fluids out of said cooling region.

19. A motor as defined in claim 18 wherein said stator unit has an outer surface, said frame arrangement having an inner surface to engage said outer surface, an inlet channel in fluid communication with said inlet passage and an outlet channel in fluid communication with said outlet passage.

* * * * *